United States Patent [19]

Gulick

[11] Patent Number: 5,941,976
[45] Date of Patent: Aug. 24, 1999

[54] INTERRUPT REQUEST DEASSERTION INTERLOCK MECHANISM

[75] Inventor: Dale E. Gulick, Austin, Tex.

[73] Assignee: Advanced Micro Devices, Inc., Sunnyvale, Calif.

[21] Appl. No.: 08/955,309

[22] Filed: Oct. 20, 1997

[51] Int. Cl.$^6$ ................................................. G06F 13/24
[52] U.S. Cl. .................... 710/260; 710/262; 710/266
[58] Field of Search .................... 395/733, 735, 395/739, 868, 869; 710/260, 262, 266, 48, 49

[56] References Cited

U.S. PATENT DOCUMENTS

| | | | |
|---|---|---|---|
| 4,941,081 | 7/1990 | Kumar et al. | 364/147 |
| 5,410,710 | 4/1995 | Sarangdhar et al. | 395/739 |
| 5,515,530 | 5/1996 | Eskandari | 395/180 |

OTHER PUBLICATIONS

Intel, "82371FB (PIIX) and 82371SB (PIIX3) PCI ISA IDE Xcelerator", May 1996, pp. 1–118.
Common Architecture, "Desktop PC/AT systems", Mar. 21, 1996, Version .93 Preliminary, pp. 1–26.
Advanced Micro Devices, "AM7968/Am7969 TAXIchip™ Article Reprints", Jan. 22, 1987, pp. 1–77, particularly pp. 67–72.
National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary—Nov. 1995, pp. 1–110.
Intel, "8259A Programmable Interrupt Controller 8259A/8259A-2/8259A-8," Oct. 1996, pp. 2–234 through 2–257.
Messmer, Hans–Peter, "The Indispensable PC Hardware Book: Your Hardware Questions Answered, Second Edition," published by Addison–Wesely, Harlow, England, 1995, pp. 5–57 through 5–73.

*Primary Examiner*—Gopal C. Ray
*Attorney, Agent, or Firm*—Zagorin, O'Brien & Graham, LLP

[57] ABSTRACT

An interrupt circuit on a first integrated circuit receives a plurality of interrupt request signals, at least one of which is provided over a bus. A interrupt synchronization control circuit receives an update synchronization signal, indicating when a value of one of the interrupt requests provided to the interrupt circuit has been updated. The interrupt synchronization control circuit also receives an end of interrupt from a processor. The interrupt synchronization control circuit prevents the interrupt circuit from reevaluating its interrupt request signals based on the end of interrupt until after a next update synchronization signal is received, thus synchronizing the reevaluating of interrupt requests to receipt of updated interrupt request information.

19 Claims, 14 Drawing Sheets

INTERRUPT REQUEST DEASSERTION INTERLOCK MECHANISM

CROSS REFERENCE TO RELATED APPLICATIONS

This application relates to the following co-pending application entitled "PC CORE LOGIC SERIAL REGISTER ACCESS BUS", Ser. No. 08/928,035, filed Sep. 11, 1997, by Dale E. Gulick; which application is incorporated herein by reference.

BACKGROUND OF THE INVENTION

1. Field of the Invention

The present invention relates to computer systems, and, more particularly, to the partitioning of input/output functions among integrated circuits.

2. Description of the Related Art

A typical personal computer (PC) system includes a microprocessor, associated memory and control logic and a number of peripheral devices that provide input and output for the system. Such peripheral devices typically include a display monitor, a keyboard and mouse, a floppy disk drive, a hard disk drive and a printer. The number of devices being added to personal computer systems continues to grow. For example, many computer systems also include modems, sound devices, and CD-ROM drives.

PC systems use one of several expansion bus architectures to facilitate communication between various components of the system and to provide the versatility needed to add additional components to the system. For example, the Industry Standard Architecture (ISA) provides an expansion bus for the 16-bit IBM AT personal computer. The Enhanced ISA (EISA) provide for systems utilizing 32-bit microprocessors such as the Intel 80386 and 80486 microprocessors. The Peripheral Component Interconnect (PCI) bus provides a bus architecture for 32-bit or 64-bit interconnection systems independent of processor generation or family.

The ISA bus, originally called the Advanced Technology (AT) bus, added the functionality needed for full 16-bit technology, but maintained compatibility with an older 8-bit PC bus. Because of its initial speed and data-path match with the 80286 microprocessor, the original ISA bus substantially out-performed the PC bus. The ISA bus has resisted replacement by newer bus architectures such as EISA and Microchannel, and remains commonplace in personal computer systems in use today. That is true in part because many devices that are designed to interface with the ISA bus are in widespread use today. Such devices are known as legacy devices since their design is based on older PC technology. Examples of such slower legacy devices include keyboards, and mouse(s), game ports, floppy drives, modems and printers connected respectively to serial and parallel communication ports, direct memory access (DMA) controllers, interrupt controllers and timers. Those legacy devices do not need the high speed throughput of the newer generation of buses such as EISA, Microchannel Architecture (MCA) and the Peripheral Component Interface (PCI) bus.

Although personal computer system speeds, and particularly microprocessor speeds, have increased dramatically, e.g. to 300 MHz and beyond, the speed of the ISA bus is limited to approximately 8 MHz. As higher speed processors were utilized, dedicated memory buses were added to personal computer systems because the ISA bus was too slow for the required high speed memory accesses. Video applications also became limited by the bandwidth of the ISA, so systems began to use a "local bus" for video applications. Although initially targeted at advanced video systems, new local bus specifications were made broad enough for handling other peripherals requiring high-bandwidth transfers such as mass storage devices and network interfaces.

The Peripheral Component Interconnect (PCI) bus is one example of a local bus specification. The VL bus is another local bus specification that has been less widely adopted. The PCI bus provides a high-speed interconnection system which runs more closely to microprocessor speeds than does a traditional expansion bus. And, although initially designed for 32-bit microprocessors, the PCI specification is broad enough to include the 64 bit data paths of the advanced processors. Legacy devices compatible with older bus architectures such as ISA connect to the PCI bus via a bus bridge circuit which provides for a translation between the protocols of the ISA and PCI buses.

Many present day personal computer systems contain both a PCI bus and an ISA bus. The PCI bus is used to connect to newer peripherals and/or those peripherals requiring a higher speed interface. The ISA bus is typically connected to legacy devices. Historically, interfaces to peripherals utilized a large number of discrete components. However, increased levels of integration has resulted in the logic necessary for interfacing to peripheral devices being combined into a relatively few integrated circuits (ICs), are sold as chip sets for the PC, such as such as Intel's 430 VX chip set. The integrated circuits include a plurality of terminals, pins, or leads, connecting the integrated circuit to the printed circuit board (PCB) to which the integrated circuit is mounted. The PCB functions as a system board. The terminals communicate input/output (I/O) signals between one integrated circuit and other integrated circuits or I/O devices coupled to the system board. These system boards often receive expansion boards to increase the capabilities of the computer system and to connect to peripheral devices, e.g., through the ISA bus.

Referring, to FIG. 1, an exemplary prior art computer system 100 is shown conforming to the above architectural approach of including both a PCI bus and an ISA bus. Computer system 100 includes processor 110 which is coupled to secondary cache 115 and memory 140. Bridge 120 provides an interface between the processor/memory system 105 and PCI bus 125. Bridge 120 provides a communication link between PCI devices 150, 160 and 170 and the processor/memory system 105. Although the PCI bus was originally intended for graphics, high speed graphics requirements have resulted in another specialized graphics bus called the Advanced Graphics Port Bus which can be utilized in place of the PCI bus for graphics applications. The PCI devices may be integrated circuits on the system board of computer system 100, expansion components connected to PCI bus 125 via expansion slots, or some combination thereof. A second bridge 130, provides a bus interface between PCI bus 125 and ISA expansion bus 135. In order to communicate with legacy devices which are designed to interface to the ISA bus, one approach, has been to provide super I/O chip 170 which provides the logic and pins to interface to legacy devices.

Super I/O chip 170 provides I/O terminals and control logic for commonly used legacy peripheral devices such as keyboards, IDE drive, IEEE parallel port, serial communication ports. One example of such an I/O chip is the National Semiconductor PC87306 SuperI/O™ chip. Thus, legacy devices can be included in the system by utilizing the bridge 130, the ISA bus, and super I/O chip 170. In order to integrate functional logic into as few parts as possible it would be desirable it integrate a bridge fiction with a legacy I/O chip. However, that can require a larger number of input/output pins than can be economically accommodated on a single chip.

One approach to minimize pins on super I/O chips is to provide interrupt requests serially. However, that approach may result in synchronization problems between servicing of the interrupt by the processor and the interrupt circuit checking to see if there are any additional pending interrupts. Specifically, the interrupt circuit may erroneously recognize as a pending interrupt an interrupt that has just been serviced. That is due to latency between the time the processor notifies the interrupt circuit that the request has been serviced and the time it takes for the requesting circuit to communicate its deasserted interrupt request back to the interrupt circuit.

SUMMARY OF THE INVENTION

Accordingly, the invention provides an interrupt circuit that synchronizes evaluation of pending interrupts with deassertion of interrupt requests. In one embodiment an interrupt circuit receives a plurality of interrupt request signals, at least one of which is provided over a bus. An interrupt synchronization control circuit receives an update synchronization signal, indicating when a value of one of the interrupt requests provided to the interrupt circuit has been updated. The interrupt synchronization control circuit also receives an end of interrupt indication indicating that a particular interrupt has been serviced. The interrupt synchronization control circuit prevents the interrupt circuit from reevaluating its interrupt request signals normally triggered by the end of interrupt indication until after a next update synchronization signal is received, thus synchronizing the reevaluating of interrupt requests to receipt of updated interrupt request information.

In another embodiment of the invention, a method includes providing interrupt request signals to an interrupt circuit located on a first integrated circuit. An update synchronization indication is provided to an interrupt synchronization control circuit which indicates that updated values of the interrupt request signals are available. The interrupt synchronization control circuit also receives an end of interrupt indication and prevents the interrupt circuit from evaluating pending interrupts after an end of interrupt indication has been received until after a next update synchronization signal is received.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

DESCRIPTION OF THE PREFERRED EMBODIMENT(S)

Figure 1:
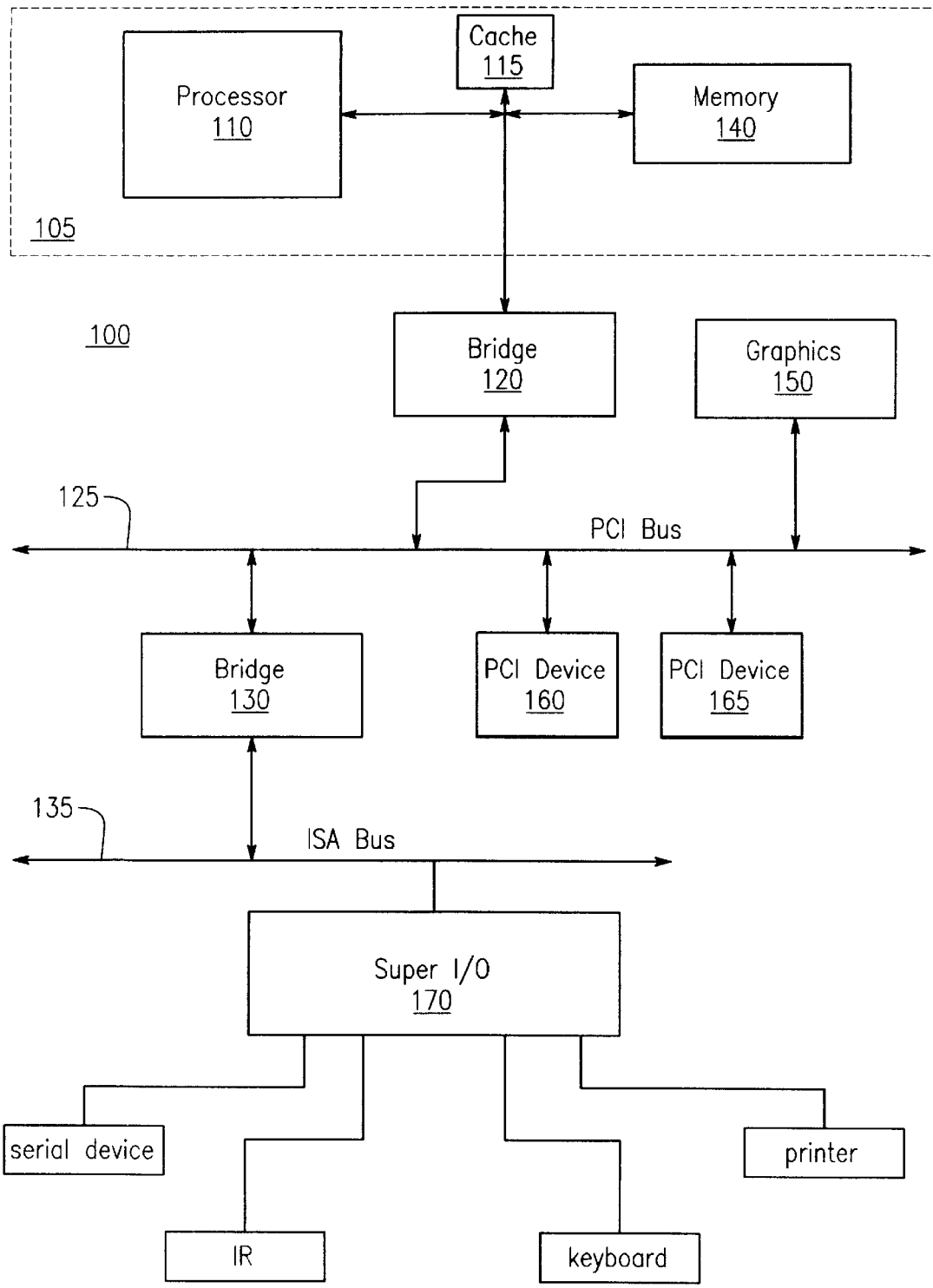
FIG. 1 shows a schematic block diagram of a prior art personal computer system.
Figure 2:
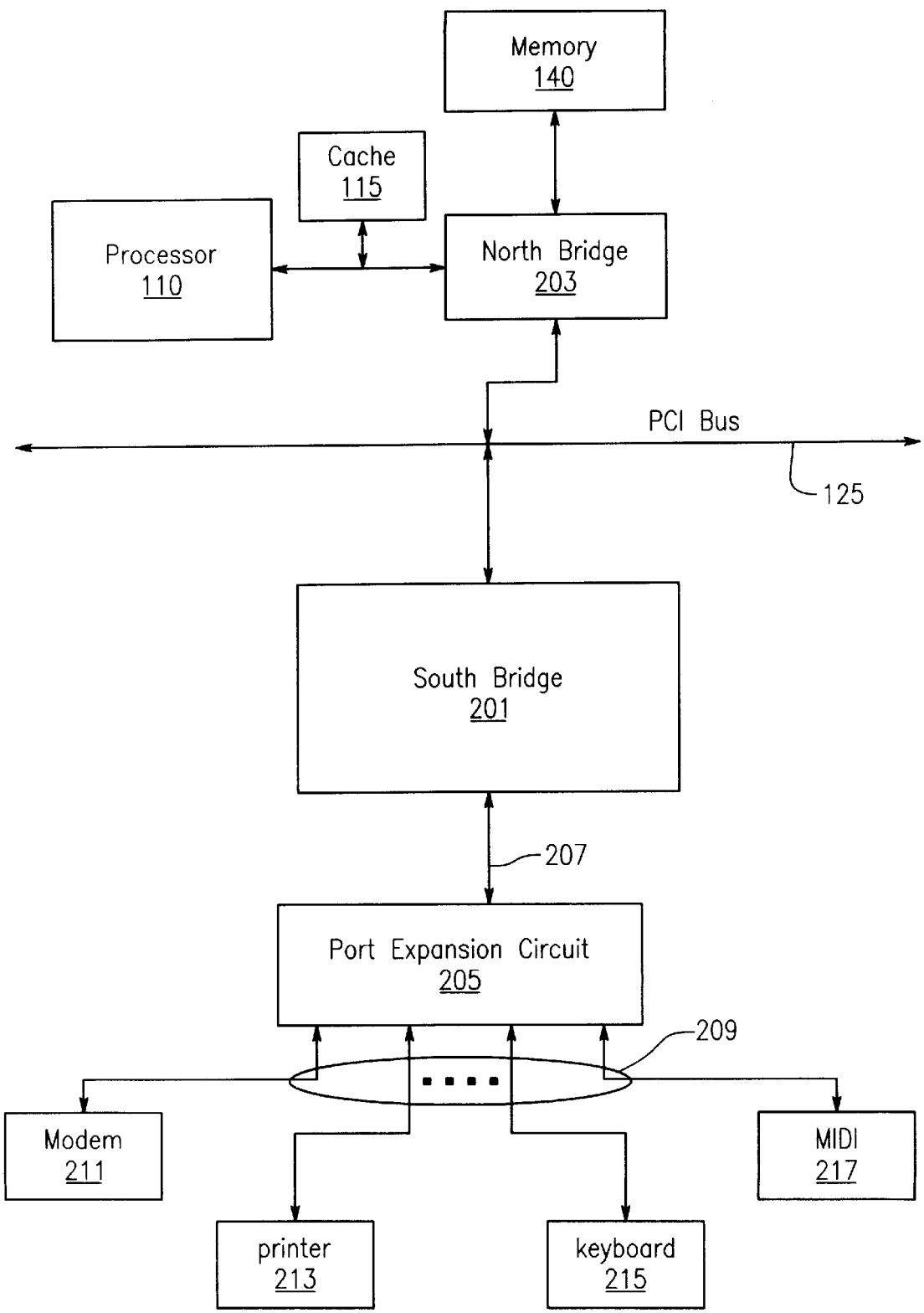
FIG. 2 shows a block diagram of a computer system which includes a South Bridge circuit and port expansion circuit in accordance with the present invention.

FIG. 2 shows one embodiment of a personal computer system according to the present invention. The personal computer system comprises processor 110 which is coupled to cache memory 115 and memory 140. Bridge circuit 203 (North Bridge), provides an interface between the processor 110 and PCI bus 125. North Bridge 203 also provides an interface between the PCI bus 125 and memory 140. Bridge circuit 201 (South Bridge) provides an interface between PCI bus 125 and a plurality of devices and/or interfaces. A separate integrated circuit 205, connects to the South Bridge 201 via port expansion bus 207. The separate circuit 205 will be referred to herein as the port expansion circuit (PEC). The port expansion bus (PEB) is a seven pin serial bus.

Figure 3:
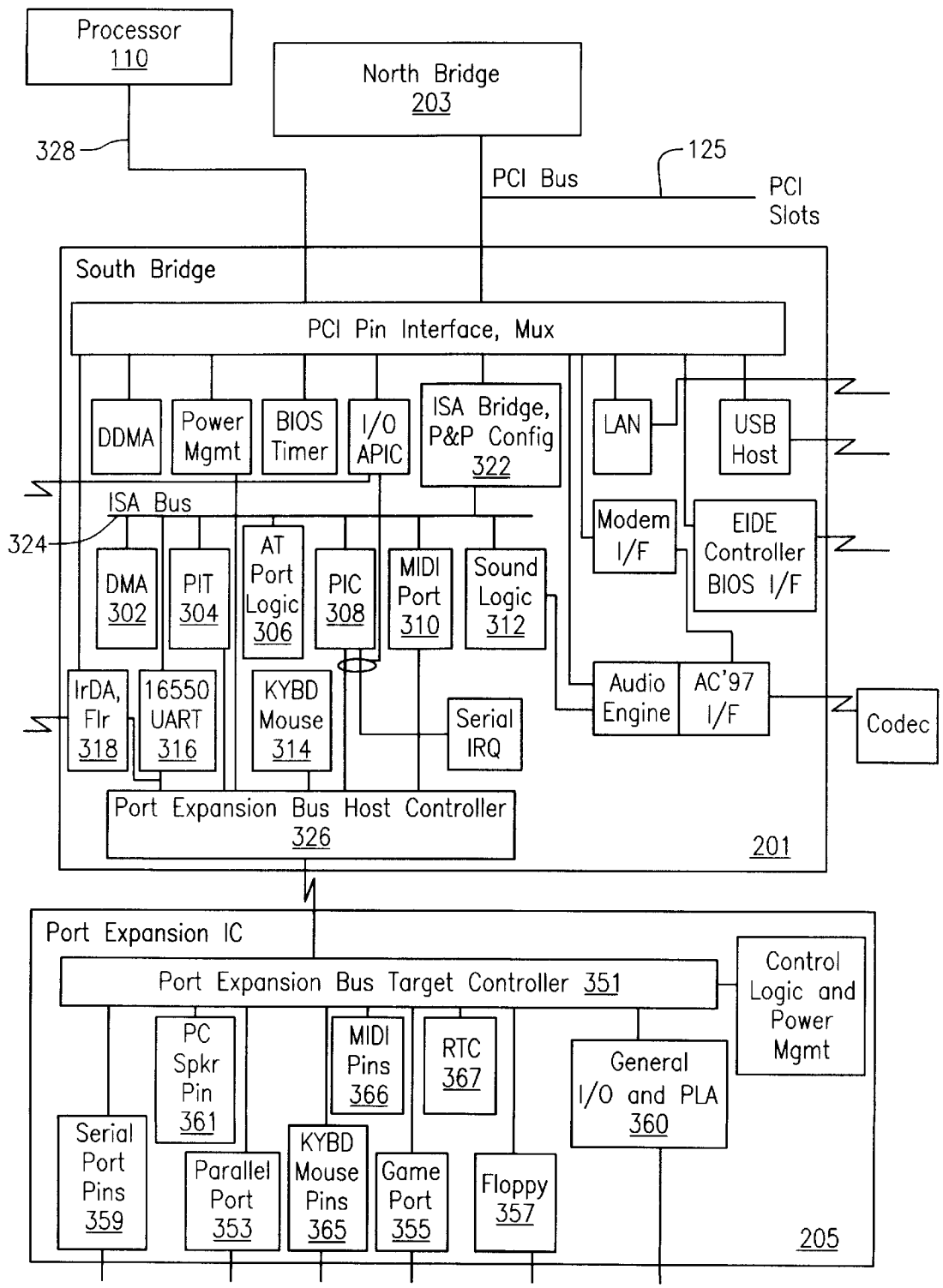
FIG. 3 shows a block diagram of the South Bridge integrated circuit and the Port Expansion integrated circuit of the personal computer architecture of FIG. 2.

Referring to FIG. 3, the South Bridge 201 and the port expansion circuit 205 are shown in greater detail. The South Bridge provides an interface 320 with the PCI bus. Interface 320 in one embodiment of the invention is a multiplexer structure providing a way to interface various blocks on the South Bridge with PCI bus 125. One such block is the ISA bridge 322. The bridge 322 creates an internal ISA bus 324 on the South Bridge. Full ISA compliance is not a requirement to interface to the various ISA resident blocks, but providing full ISA capability, including bus mastering capability may provide greater flexibility. The various ISA resident blocks on the internal ISA bus 324 in the South Bridge circuit include direct memory access (DMA) block 302 (e.g., dual 8237A compatible controllers), Programmable Interval Timer (PIT) 304 (e.g., an 8254 compatible counter/timer unit), AT port logic 306, programmable interrupt controller 308 (e.g., 8259A compatible), musical instrument digital interface (MIDI) 310, sound logic, (e.g., SOUND BLASTER) block 312, one or more universal asynchronous receiver transmitter(s) (UART) block 316, which for the embodiment shown is a 16550 UART, and keyboard/mouse logic 314. These blocks are representative, in that additional or fewer ISA resident functional blocks may actually be provided in any particular South Bridge embodiment.

The South Bridge also includes sideband signals 328 which are coupled to processor 110. Such sideband signals provide for legacy signals such as interrupts which can not be handled over the PCI bus.

In addition to the South Bridge having ISA resident blocks, PEC 205 also includes ISA resident blocks. For example, PEC 205 includes parallel port 353, game port 355, real time clock (RTC) 367, floppy disk drive controller 357. Such logic is well known in the personal computer industry and is not described further herein except where necessary for a better understanding of the claimed invention. The PEC also provides all of these ISA resident blocks with the necessary I/O terminals to connect to the legacy devices. Thus, for instance, the floppy control block 357 can be coupled to a floppy drive (not shown) and game port 355 can be coupled to a joystick (not shown) and parallel port 353 can be coupled to a printer (not shown) on the parallel port.

The PEC also provides a pin reflection fiction for the South Bridge. That means that the states of relatively slowly changing signals are transmitted over a time-division serial bus and recreated on the other side. That is, the PEC provides I/O terminals for some of the ISA resident blocks in the South Bridge such as UART 316, PIT 304, keyboard/mouse logic 314 and MIDI port 310. Output signals that would ordinarily be output by I/O terminals on the South Bridge to a legacy device, are instead transmitted to the PEC, and then output to the legacy device from I/O terminals on the PEC. Thus, serial port pins 359 provide the input/output pins for UART 316. Similarly, output pin 361 provides PIT 304 a connection to the PC Speaker. Keyboard/mouse pins 361 which connect respectively to a keyboard and mouse provide I/O pins for keyboard/mouse logic 314 in South Bridge 201. Finally, in the embodiment shown, MIDI pins 365 provide a connection to a musical instrument for MIDI port 310.

In order for the Port Expansion Circuit 205 to provide I/O function for the South Bridge integrated circuit, the output signals have to be sampled in the South Bridge and provided to the output pins of the port expansion circuit at a rate faster than the output signals change. Additionally, the input signals on the input pins of the port expansion circuit have to be sampled and provided to the interface logic blocks in the South Bridge integrated circuit at a rate faster than the input signals change.

Thus, the PEC is seen to provide several functions. One function is to provide I/O terminals for pin reflection. Another function is to provide both the functional logic and the I/O terminals for ISA resident logic blocks. Accordingly, to accommodate ISA resident functional logic blocks, the port expansion bus target controller block 351 recreates an internal ISA-like parallel bus in the port expansion circuit 205 which is described in greater detail in FIG. 14 and related discussion. The recreated parallel bus couples to ISA resident blocks in the port expansion circuit, such as parallel port 353, game port 355 and floppy control logic 357.

Serial bus 207, which couples the South Bridge integrated circuit 201 to the port expansion integrated circuit 205, provides both the pin reflection function by transferring the state of input/output signals across the bus and also provides for register access operations to ISA addressable registers in the PEC. The serial bus 207 also provides for additional functions which are described further herein.

Figure 4:
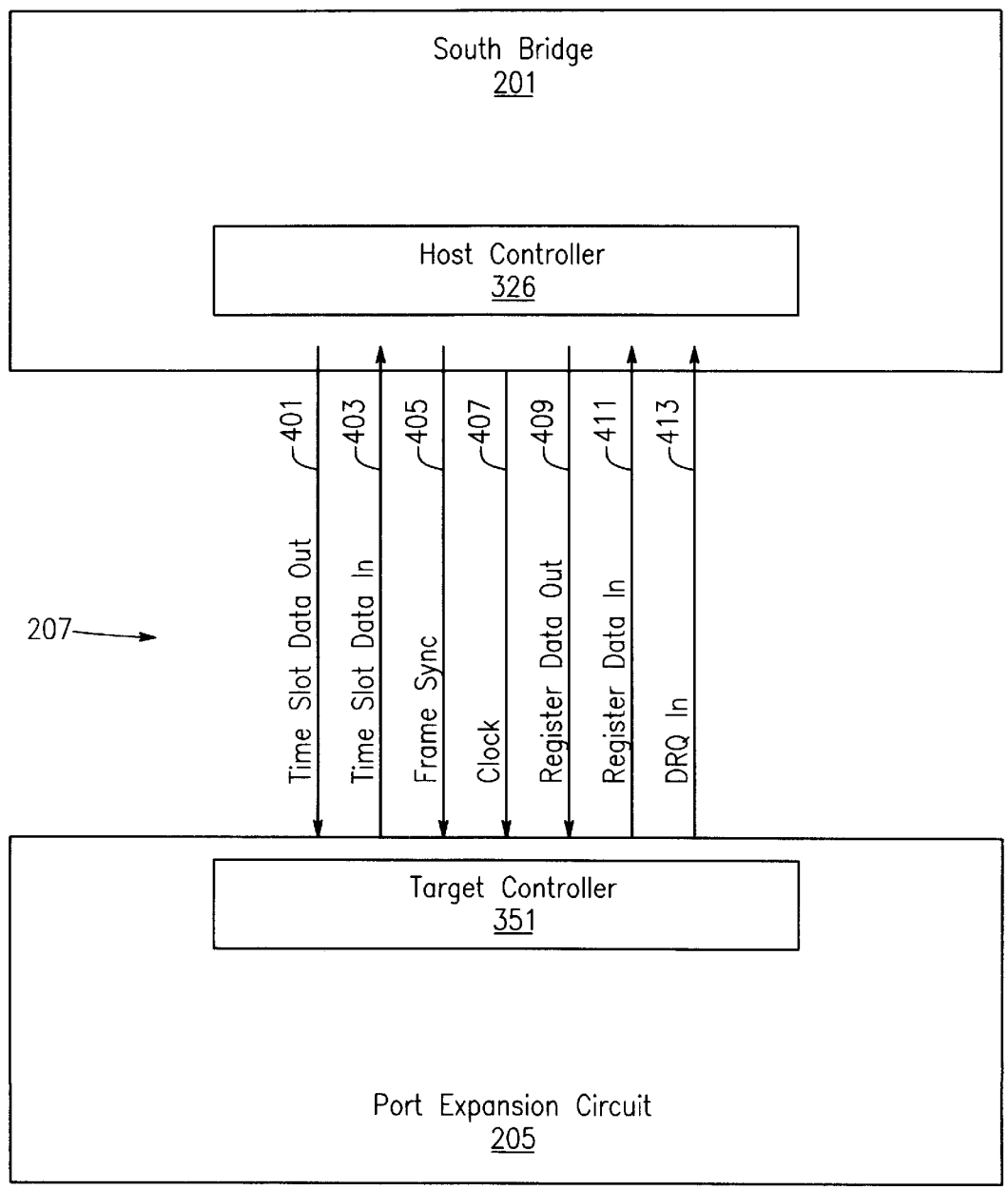
FIG. 4 shows a seven line embodiment of the port expansion bus (PEB) connecting the South Bridge and the port expansion circuit of the computer system of FIG. 2 including a time slot portion and a register transfer portion.

Referring to FIG. 4, the port expansion bus provides a time slot bus for "pin reflection." The time slot bus transfers frames of relatively slowly changing data between the South Bridge 201 and the port expansion circuit 205. In one embodiment each frame has 32 data bits. The time slot bus includes time slot data out signal line 401, time slot data in signal line 403, frame sync 405 and clock 407. The time slot bus transfers relatively slow signals on time slot data out signal line 401 from South Bridge 201 to be output by port expansion circuit 205. The signals are time multiplexed and are provided to the appropriate output pin and thus the output device according to the time slot on the bus. The time slot bus also operates to transfer signals that are received from relatively slow legacy devices such as a modem coupled to serial port pins 359, from the port expansion circuit to the South Bridge on time slot data in signal line 403.

Figure 5A:
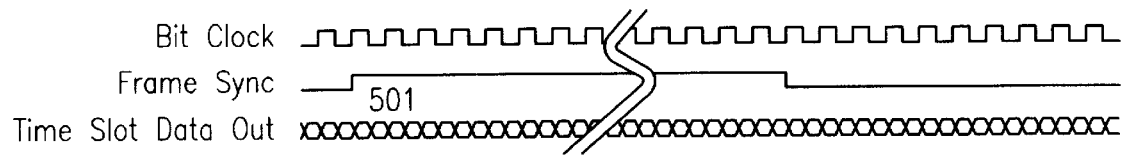
FIG. 5a is a timing diagram showing a frame sync signal for the time slot portion of the port expansion bus (PEB).
Figure 5B:
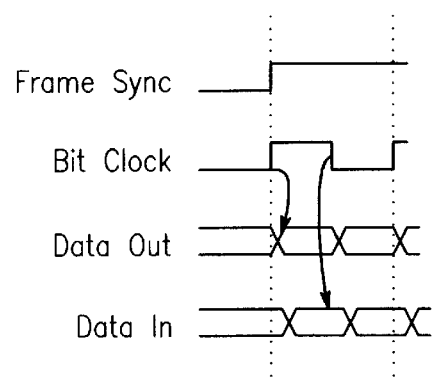
FIG. 5b is a timing diagram showing the relation between the frame sync signal, the bit clock, Data In and Data Out on the port expansion bus.

Referring to FIG. 5a, the beginning of each frame for the time slot bus is determined by assertion of the frame sync signal at 501 which is synchronous with the bit clock. The frame sync signal is preferably a 50% duty cycle signal and is output from the South Bridge. The frame sync frequency (2.0625 Mhz), in the embodiment shown, is 1/16 that of the bit clock which is a 33 Mhz 50% duty cycle clock (same frequency as the PCI clock). Frames are synchronized to the rising edge of the frame sync signal. Data on the time slot bus is synchronized with frame sync with time slot 0 on the bus corresponding to the rising edge of frame sync. As shown in FIG. 5b, a data bit is provided on both the rising and falling edge of the clock. Thus, data on signal lines 401 and 403 is transmitted on both the rising and falling edges of the clock. Accordingly, a 32 bit frame requires 16 bit clock periods. The data provided by the PEC on the rising edge of the bit clock is latched on the falling edge of the bit clock in the South Bridge as shown in FIG. 5b. In the embodiment shown, bit clock 407 is output from the South Bridge integrated circuit.

The clock, frame sync, time slot data in and data out signals are held high when the bus is deactivated. Note that other frame lengths, clock frequencies and duty cycles are of course possible.

An exemplary frame sent to and from PEC 205 is shown in Table 1. The bits transmitted to the PEC include bits 0–3 which are signals to be provided to the serial port pins on the PEC. Bits 0 and 1 are pin reflection signals including transmit data (TD) for serial ports 1 and 2, request to send (RTS/) and data terminal ready (DTR/) for port 0. The data transmit data bits for serial port 0 and 1 are repeated for bits 6 and 7. Port 1 RTS/ and DTR/ bits are provided in bits 8 and 9. MIDI data is provided on bits 12 and 26. Keyboard and mouse data is provided on bits 27 and 28. A mouse clock out bit is provided on bit 30 and a PC speaker on bit 31. The detailed operation the various ports and interfaces with respect to those control and data bits is well known in the art. The bus speed of the time slot bus should be sufficient to ensure that the various devices receive necessary data and control signals in a timely manner, i.e., the pin reflection function keeps up with the rate of change of the various

TABLE 1

| Bit # | Transmit to PEC | Receive from PEC |
| --- | --- | --- |
| 0 | Serial port 0 TD | Serial port 0 RD |
| 1 | Serial port 1 TD | Serial port 1 RD |
| 2 | Serial port 0 RTS/ | Serial port 0 CTS/ |
| 3 | Serial port 0 DTR/ | Serial port 0 DSR/ |
| 4 | Reserved | Serial port 0 DCD/ |
| 5 | Reserved | Serial port 0 RD |
| 6 | Serial port 0 TD | Serial port 1 RD |
| 7 | Serial port 1 TD | Serial port 0 RI |
| 8 | Serial port 1 RTS/ | Serial port 1 CTS/ |
| 9 | Serial port 1 DTR/ | Serial port 1 DSR/ |
| 10 | Reserved | Serial port 1 DCD/ |
| 11 | reserved | Serial port 1 RI |
| 12 | MIDI Tx Data | MIDI Rx Data |
| 13 | Reserved | Wake-up A |
| 14 | Reserved | Wake-up B |
| 15 | Reserved | Wake-up C |
| 16 | Serial port 0 TD | Serial port 0 RD |
| 17 | Serial port 1 TD | Serial port 1 RD |
| 18 | Reserved | Power button |
| 19 | Reserved | Sleep button |
| 20 | Reserved | Reserved |
| 21 | Reserved | Reserved |
| 22 | Reserved | Wake-up D |
| 23 | Reserved | Wake-up E |
| 24 | Serial port 0 TD | Serial port 0 RD |
| 25 | Serial port 1 TD | Serial port 1 RD |
| 26 | MIDI Tx Data | MIDI Rx Data |
| 27 | Keyboard Data Out | Keyboard Data In |
| 28 | Mouse Data Out | Mouse Data In |
| 29 | Keyboard Clock Out | Wake-up F |
| 30 | Mouse Clock Out | Wake-up G |
| 31 | PC Speaker | Wake-up H |

Table 1 also shows the bits received from the PEC. Bits 0–11, 16 and 17, 24 and 25 relate to the serial port. Included in the signals received are receive data (RD), clear to send (CTS), data set read (DSR/), data carrier detect (DCD), and ring indicator (RI). The receive frame also includes MIDI receive data (bits 12 and 26) and several bits associated with power control features including wake-up bits 13–15, 22–23, and 29–21 and power and sleep buttons 18 and 19. The wake-up bits and power and sleep buttons relate to power management funtions. For example, if the system is in a sleep state, the wakeup buttons can indicate which event caused the wakeup to occur. In addition, the receive frame includes data from the keyboard and mouse (bits 27 and 28, respectively).

Thus, every frame includes the data and control bits shown in Table 1. All bits in Table 1 are numbered with respect to the leading edge of frame sync. The time slot bus is "protocol free", in that there is little overhead associated with transferring data. The bus simply continuously transfers frames between the port expansion circuit and the South Bridge. In the embodiment shown, the frames are contiguous in that there is no time between each frame, i.e., the start of bit 0 is one half clock period from the start of bit 31. However, other embodiments may provide sometime period between frames so long as the time slot bus stays substantially continuously running to satisfy the speed requirements of the pin reflection approach described herein. Note that the I/O pin values are transferred every frame whether they change or not. Also note that transmit and receive data bits may be transmitted more than one time per frame. That further reduces latency for pin reflection purposes. At a data bit rate of 66 Mhz, the MIDI port in the South Bridge can transmit and receive data via the I/O pins on the PEC at an a rate of 4.125 Mhz (twice per frame). Note that the time slot bus does not operate while the port expansion circuit and South Bridge are in a power down mode to reduce power consumption.

Figure 6:
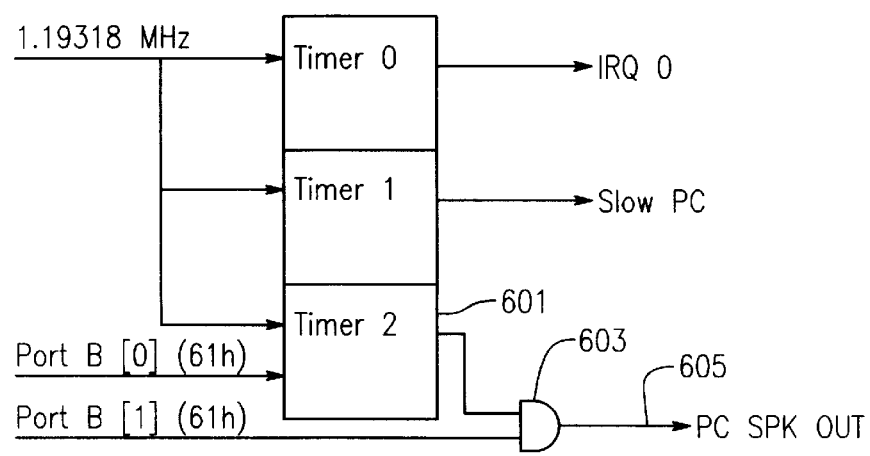
FIG. 6 shows external gating of the PC speaker out signal.

An exemplary pin reflection function according to the invention is described as follows. The PC Speaker is connected to the counter-timer block 304 in the South Bridge and the frequency of the speaker is determined by the frequency of the digital signal output by the counter timer block 304 which is, e.g., an 8253 or 8254-2 equivalent timer/counter. Referring to FIG. 6, the PC speaker out signal 605 is gated external to PIT 601 by I/O port B (61h) bit (1) at gate 603. The PC speaker timer (timer 2) is enabled by I/O port B bit(0)(b1h). At approximately the start of bit time 31 of each frame, the state of the counter timer's PC Speaker output is sampled in the South Bridge. Note that the state of the output of the counter timer may be sampled earlier than bit time 31. Bit position 31 in the frame is updated with the latest sampled value and transmitted to the port expansion circuit. At the port expansion circuit end, the state of the PC Speaker pin is latched during bit time 31. The PC Speaker pin on the port expansion circuit always reflects the latched value. Thus, the PC Speaker pin always reflects the state of the counter timer output, with a delay (and jitter) of up to approximately 485 nanoseconds assuming a data rate of 66 MHz and a 32 bit frame.

Various functions within a personnel computer system can utilize pin reflection as provided by the four pin time slot bus described herein. Such functions include the PC speaker, MIDI port, keyboard and mouse and serial ports.

Referring back to FIG. 4, the port expansion bus also provides a register transfer function, that is, the capability to read and write registers in ISA resident logic located in the PEC. In order to provide that register transfer function, the port expansion bus 207 includes a register transfer bus portion that includes register data out signal line 409 from the South Bridge to the PEC and register data in signal line 411 from the PEC to the South Bridge.

Figure 7:
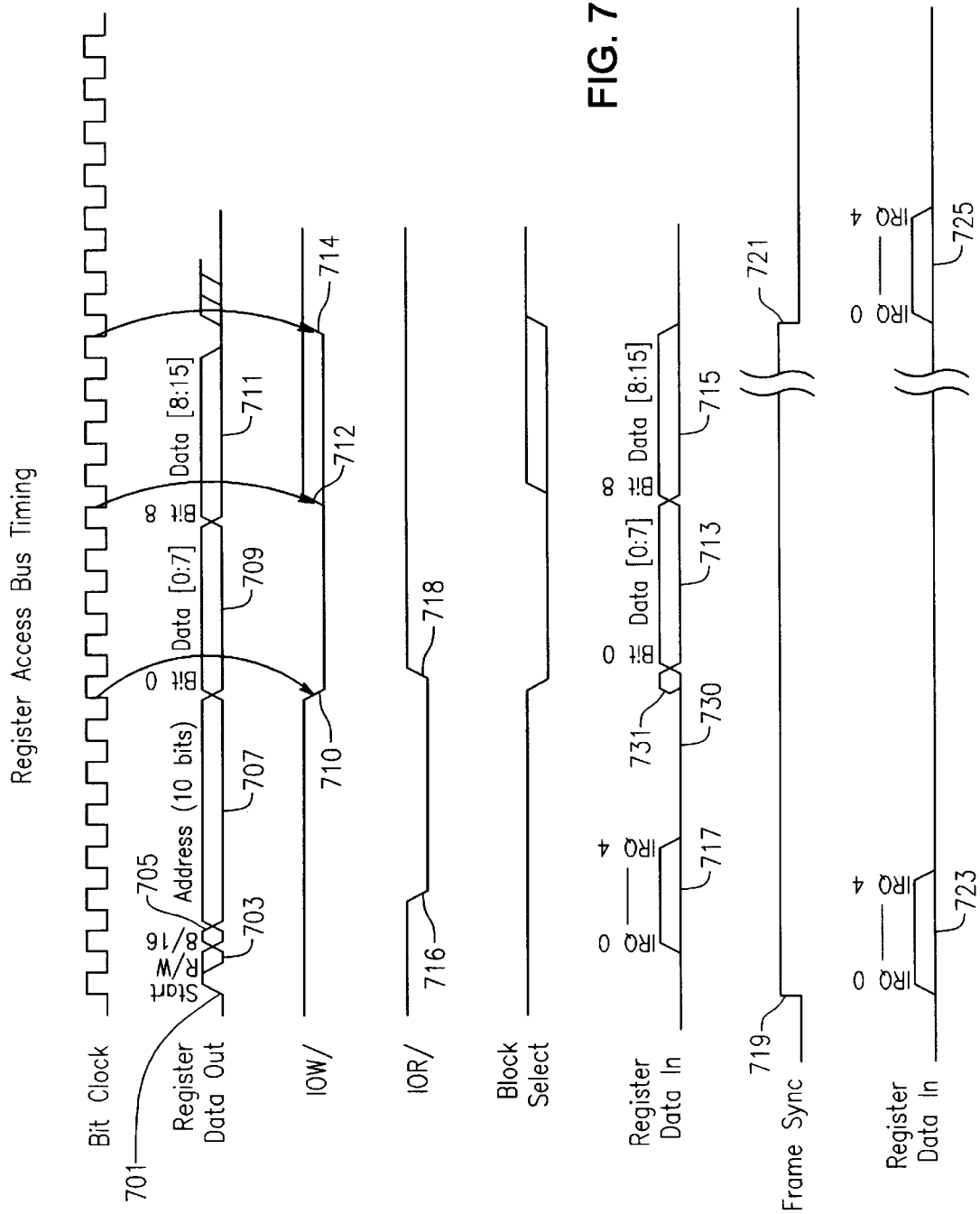
FIG. 7 shows a timing diagram for the register transfer bus portion of the port expansion bus.

The register data out line 409 is output from the South Bridge. As with the time slot bus, data is transmitted synchronous to both edges of clock 407. However, register reads and writes on the register transfer bus are asynchronous to the frame sync signal. Instead, a start bit is used. Referring to FIG. 7, the communication protocol for the register access bus is shown. Start bit 701 initiates a transfer sequence and in the embodiment shown, is always initiated from the South Bridge. Following start bit 701, read/write bit 703 indicates the direction of transfer (write=1, read=0). The next bit 705, indicates the size of the read or write operation, (1=16 bits, 0=8 bits). A 10 bit address field 707 identifies the particular register in the PEC that is to be read or written. For a write operation, eight bit data 709, or sixteen bit data, 709 combined with data 711, are provided after the address field 707.

In order to account for possible delay in obtaining read data from e.g., the parallel port, a ready bit 731 alerts the South Bridge that read data is ready. In addition, one clock cycle may be provided between the address bits and the data bits during a read cycle at 730, to provide time for the PEC to decode the address and provide the contents of the selected register to the register transfer bus. The use of the ready bit 731 may make the one clock cycle 730 unnecessary. The ready bit is not necessary if all read data can be guaranteed to be ready. The delay caused by the lack of a ready bit during the read operation can be utilized in the South Bridge to control a CHRDY signal on the ISA bus which can stall the processor when data is not yet ready from e.g., the parallel port. Once the read operation is completed, the register data out pin is held low for at least one bit time (in this embodiment half a clock cycle) between transfers so that a new start bit can be recognized. In the exemplary embodiment, the register data out pin is held high when the bus is deactivated and low when active and idle.

In addition to providing read data, the register data in signal line provides, interrupt request (IRQ) information synchronized to the frame sync signal, whenever register reads are not taking place. That is, when the bus is idle or when register writes are taking place, the register data in line which is used only during reads, is available to send IRQ data. In the described embodiment, IRQ data is sent four times per frame synchronized to frame sync in a manner similar to the previously described time slot bus. An exemplary IRQ frame is shown in Table 2.

TABLE 2

| Bit # | ASSIGNMENT |
|---|---|
| 0 | IRQ0 |
| 1 | IRQ1 |
| 2 | IRQ2 |
| 3 | IRQ3 |
| 4 | IRQ4 |
| 5 | Reserved |
| 6 | Reserved |
| 7 | Reserved |
| 8 | IRQ0 |
| 9 | IRQ1 |
| 10 | IRQ2 |
| 11 | IRQ3 |
| 12 | IRQ4 |
| 13 | Reserved |
| 14 | Reserved |
| 15 | Reserved |
| 16 | IRQ0 |
| 17 | IRQ1 |
| 18 | IRQ2 |
| 19 | IRQ3 |
| 20 | IRQ4 |
| 21 | Reserved |
| 22 | Reserved |
| 23 | Reserved |
| 24 | IRQ0 |
| 25 | IRQ1 |
| 26 | IRQ2 |
| 27 | IRQ3 |
| 28 | IRQ4 |
| 29 | Reserved |
| 30 | Reserved |
| 31 | Reserved |

The interrupt requests, are interrupts requests from such devices as the parallel port, game port, RTC, floppy controller and General I/O.

When register reads are taking place, the IRQ data 717 is provided on Register Data during the address window as shown in FIG. 7. That is, when address bits are being received, the data in line is still idle even though it is a read operation. The address window for IRQs can be any predetermined time between start bit 701 and the read data 713. If a register read starts in the middle of the receipt of a frame of IRQ data (which is synchronous to frame sync and not the start bit), the PEC ceases transmission of the frame sync IRQ data and starts the register read cycle including the tranmission of a field of IRQ data 717 as shown in FIG. 7.

In addition to providing IRQ requests, DMA requests are also generated in functional logic blocks in the PEC such as the floppy disk controller and the parallel port. In order to accommodate these DMA requests, a separate DMA request signal line 413, DRQ In, is provided as shown in FIG. 4. The DMA request signal line 413 provideds frames of DMA requests in a manner similar to the IRQ frame data. The DRQs are sent over the DRQ In line synchronous to the frame sync signal. Table 3 shows an exemplary DRQ frame with bit 0 being synchronous to the rising edge of frame sync.

TABLE 3

| Bit # | ASSIGNMENT |
|---|---|
| 0 | Floppy DRQ |
| 1 | Parallel port DRQ |
| 2 | Reserved |
| 3 | Reserved |
| 4 | Floppy DRQ |
| 5 | Parallel Port DRQ |
| 6 | Reserved |
| 7 | Reserved |
| 8 | Floppy DRQ |
| 9 | Parallel Port DRQ |
| 10 | Reserved |
| 11 | Reserved |
| 12 | Floppy DRQ |
| 13 | Parallel Port DRQ |
| 14 | Reserved |
| 15 | Reserved |
| 16 | Floppy DRQ |
| 17 | Parallel Port DRQ |
| 18 | Reserved |
| 19 | Reserved |
| 20 | Floppy DRQ |
| 21 | Parallel Port DRQ |
| 22 | Reserved |
| 23 | Reserved |
| 24 | Floppy DRQ |
| 25 | Parallel Port DRQ |
| 26 | Reserved |
| 27 | Reserved |
| 28 | Reserved |
| 29 | Reserved |
| 30 | Reserved |
| 31 | Reserved |

Figure 8:
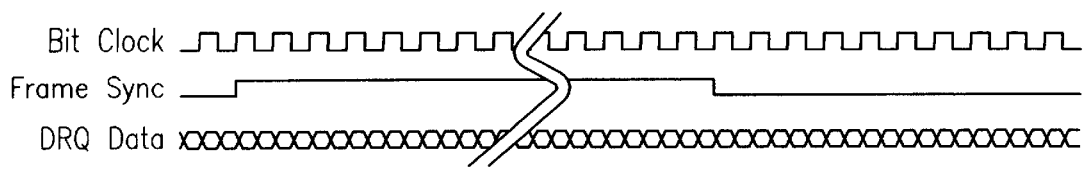
FIG. 8 shows a timing diagram for the DRQs being sent over the DRQ In signal line.

The parallel port and floppy disk controller DRQ fields are provided seven times each 32 bit frame. The number of fields provided in each frame depends upon the latency acceptable for the DRQ which is affected by such factors as the device issuing the DRQ and the speed of the bit clock. For the embodiment described herein a bit slot in the DRQ frame is determined by both the rising and falling edge of the bit clock provided on the clock line 407. In other words, each clock period contains two data bits. DRQ data is sent synchronous to both the rising and falling edges of frame sync as shown in FIG. 8.

The IRQs and DRQs provided by the PEC are routed through a mapping unit to the interrupt controllers and DMA controllers in the South Bridge as described further herein.

Figure 9:
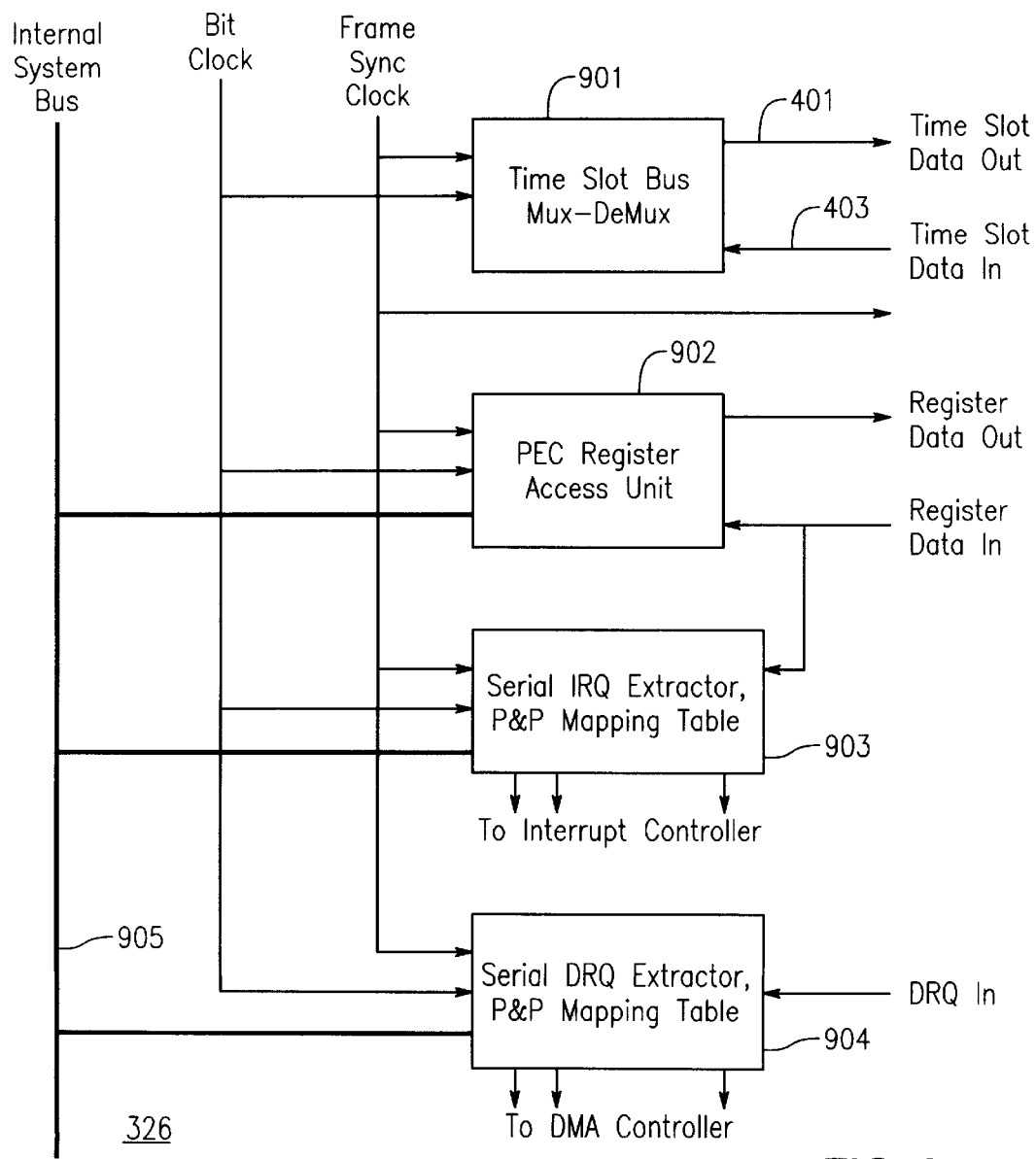
FIG. 9 shows a block diagram of the port expansion bus host controller.

Referring to FIGS. 3 and 4, the port expansion host controller 326 provides the interface between the various signal lines on the port expansion bus and the rest of the South Bridge integrated circuit. Referring to FIG. 9, the host controller 326 is shown in block diagram form. Block 901 receives the time slot data in and provides the time slot out signal lines. Block 901 also receives the frame sync and the bit clock. Block 901 provides a multiplexing-demultiplexing function to multiplex data bits from the PIT 304, keyboard/mouse controller 314, MIDI controller 310, and the serial port(s) 316 into their appropriate time slot on the time slot bus. Block 901 also receives serial port data, MIDI data, keyboard and mouse data and various power management and general I/O related signals and demultiplexes those signals at their appropriate time slot and provides the signals to the appropriate logic function in the South Bridge.

PEC Register access unit 902 receives the bit clock and frame sync from the South Bridge side and provides the register data out signal and receives the register data in signal from the PEC. In addition, the PEC register access unit 902 is coupled to the internal system bus 905, shown as ISA bus 324 in FIG. 3. Writes to an ISA address space on the PEC will be serialized and provided as described previously. For reads from the PEC registers, the data read is provided to the internal South Bridge ISA bus and across the ISA/PCI bridge to the appropriate destination, e.g., the CPU.

The serial IRQ extractor and Plug and Play (P & P) mapping table 903, extracts the IRQs from the stream of data on the register data in line and maps the IRQs according to a programmable IRQ mapping table.

The serial DRQ extractor and Plug and Play (P & P) mapping table 904, extracts the DRQs from the stream of data on the DRQ data line and maps the DRQs according to a programmable DRQ mapping table.

Figure 10:
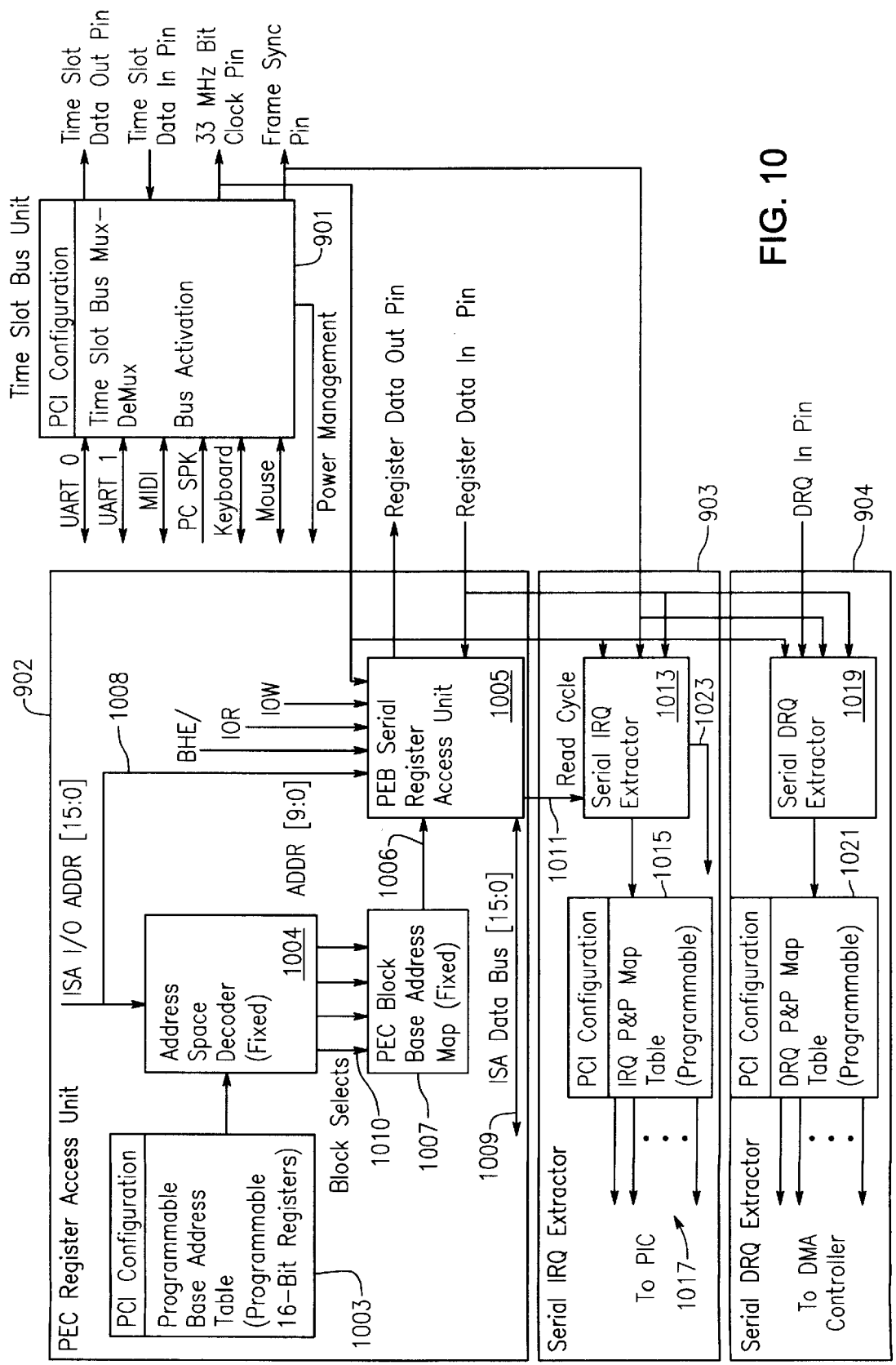
FIG. 10 shows a more detailed block diagram of the host controller shown in FIG. 9.

The block diagram of FIG. 9 is shown in greater detail in FIG. 10. The time slot bus unit 901 is mapped into PCI configuration address space. Various functions on the PCI bus are mapped into configuration space as is known in the art. Block 901 provides for bus activation from an inactive state as described further herein, as well as the multiplexing-demultiplexing function. Signals to and from UARTs 316, the mouse port and keyboard controller 314, and the PIT (PC speaker output) 304 are reflected across the PEB. The time slot bus unit multiplexes the outgoing signals onto the time slot data out pin and demultiplexes the incoming signals from the time slot data in pin.

The PEB also provides for an activation function which is recognized by logic in the time slot bus unit 901. The PEB activation function provides for a PEC initiated restart from a power down condition. Assume for example that the PC is in a reduced power state with the clocks stopped. The PEC would want to wake up the South Bridge if there were activity on e.g., the control pins of a COM port, say the Ring Indicate pin. Such activity should wake up the South Bridge from its sleep mode. The wakeup can be accomplished by the port expansion circuit requesting that the South Bridge start up the bus clocks (Bit Clock and Frame Sync). Those clocks are preferably stopped when the computer system enters sleep state to reduce power consumption.

Figure 11:
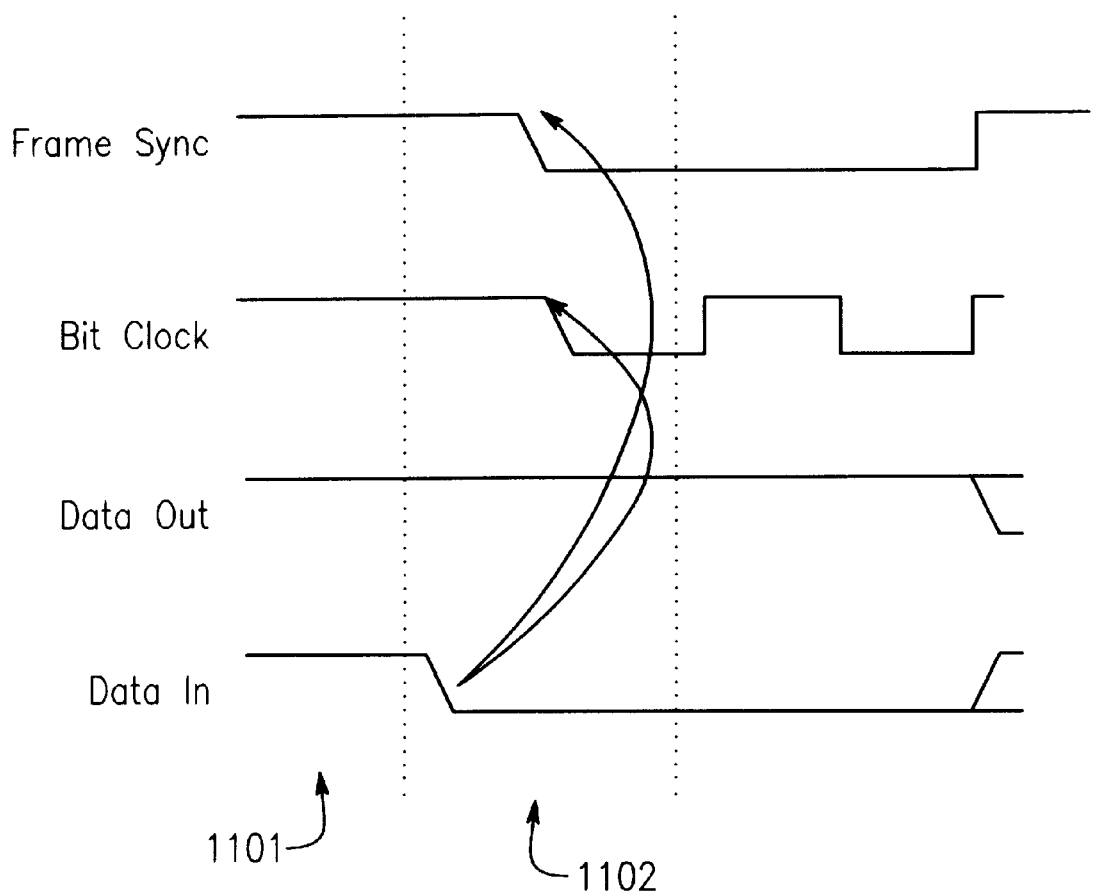
FIG. 11 is a timing diagram illustrating restarting of the port expansion bus from a power-down condition.

Referring to FIG. 11, when the bus is stopped to reduce power consumption as shown at region 1101, all of the lines on the port expansion bus are kept at a high voltage level in this embodiment. The port expansion circuit can request that the bus be restarted by pulling the time slot data in signal low as shown at 1102. The time slot data in signal is an output from the port expansion circuit to the South Bridge. The data in pin should be held low until frame sync goes low. Frame sync must go low for at least one bit time before it can go high (signifying the start of a frame). Note that while the protocol for waking up the South Bridge has been described with respect to specific polarities, other polarities can also be used depending upon the choice for indicating assertion of a signal.

The PEC register access unit 902 is also shown in more detail in FIG. 10. The PEC register access unit 902 includes the programmable base address table 1003. The table is mapped into the PCI configuration space. The table 1003 is a programmable table of registers with the 16-bit base address for each of the functions located with the PEC. These base addresses are matched (decoded) in address space decoder 1004 with the ISA I/O address from ISA bus 324 to create block selects 1010. The block selects 1010 cause the correct base address (which can be hardwired in the PEC) which is stored in the PEB block base address map 1007, to be presented to the PEB serial register access unit 1005 where the actual serial register access cycle is started in accordance with the timing diagram shown in FIG. 7. Note that the ISA data bus 1009 and ISA bus address 1008 and control signals BHE/, IOR and IOW are provided to the PEB serial register access unit 1005. Thus, for instance, if a device in the PEC has an address space of 16 bytes, e.g., the floppy controller, some of the high order address bits of the 10 address bits provided from the ISA bus to the PEB serial access unit 1005 may be replaced to indicate the correct address as hardwired in the PEC.

The serial IRQ extractor and P&P mapping table 903 is shown in more detail in FIG. 10. The serial IRQ extractor gathers IRQ data from the register data in pin both during the address portion of each read cycle (717 in FIG. 7) and during a write cycle and when the bus is idle. The location of the IRQ data is based on the time slot assignments (723 in FIG. 7) which are determined relative to the start bit 701 during the read cycle or the frame sync during a write cycle and when the bus is idle. Read cycle indication 1011 is provided from register access unit 1005 along with frame sync to the serial IRQ extractor 1013. Once the IRQ data has been gathered, it is provided to IRQ P&P mapper 1015. IRQ update sync signal 1023 indicates when the updated IRQ values are available. IRQ P&P mapper 1015 routes each of the five IRQ signals to software programmable destinations on the programmable interrupt controller 308. The mapper function may be located physically as part of interrupt controller 308. For legacy reasons, certain fixed interrupt mappings may be preferred. Specifically, the real time clock (RTC) 367 is preferably assigned IRQ8 and the floppy disk controller 357 is preferably assigned IRQ6. In the disclosed embodiment, one IRQ is provided from each of the floppy disk controller, parallel port, RTC, game port and general I/O blocks. Since the parallel port 353 can be assigned as either port 1 or port 2, using IRQ7 and IRQ5, respectively, the parallel port IRQ is software mappable. The game port and general purpose I/O IRQs are also software mapped. The programmed and/or fixed interrupts 1017 are then provided to the programmable interrupt controller 308.

Figure 12A:
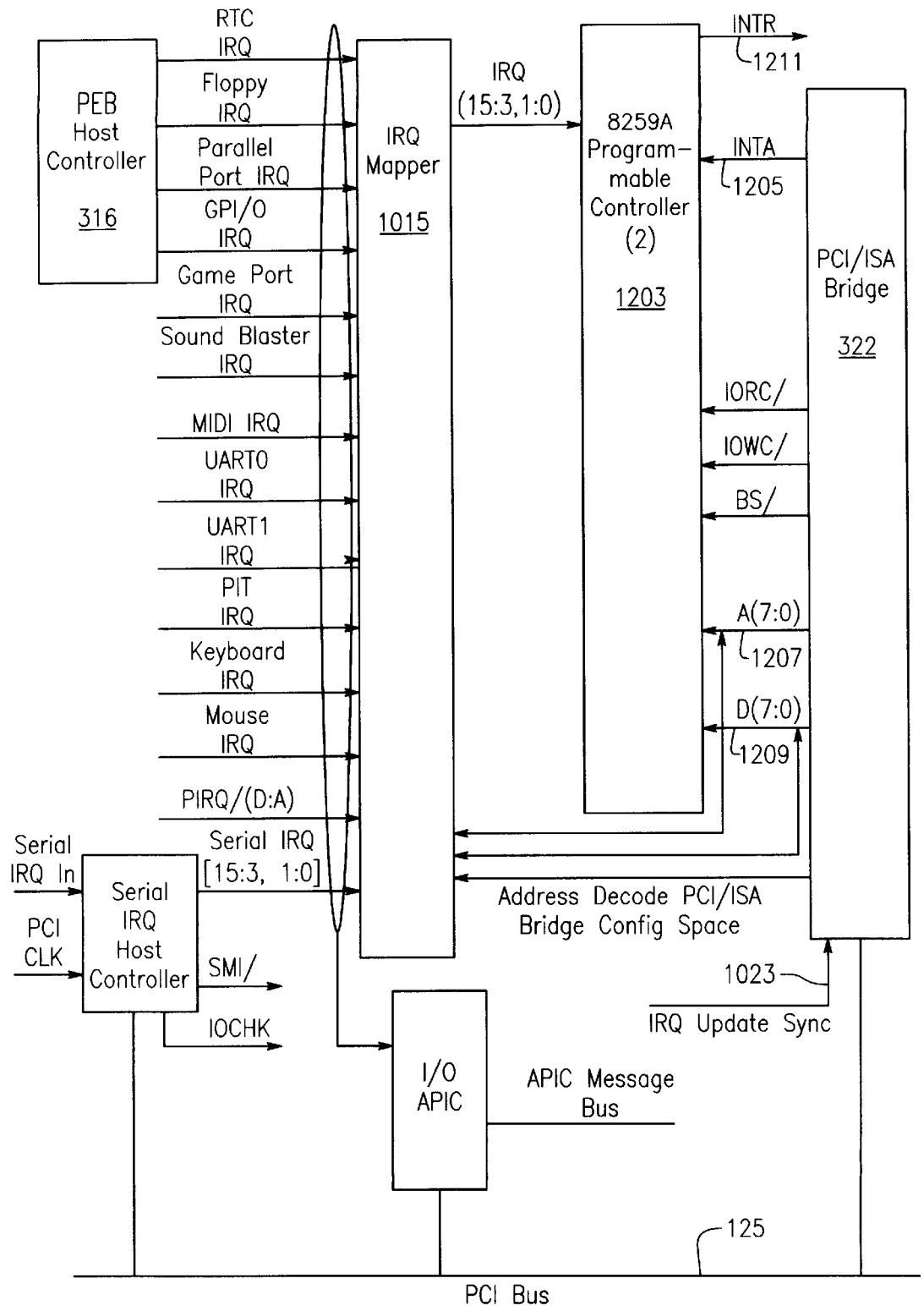
FIG. 12A is a block diagram of the interrupt control logic in the South Bridge.

Referring to FIG. 12A, the IRQ mapper 1015 and the programmable interrupt controller 308 (shown as 1203) are shown in a more detailed block diagram. The programmable interrupt controller 1203 in the embodiment shown includes two 8259A compatible programmable interrupt controllers. The five IRQs from PEB host controller 316 are provided to the IRQ mapper 1015 which in turn are mapped according to the IRQ programmable table and provided to programmable interrupt controller 1203.

When an asserted interrupt is received over the register data in pin and extracted by the serial IRQ extractor 1013, it is mapped according to the programmable mapping table and provided to the programmable interrupt controller 1203. Of course, unasserted interrupts are provided in the same manner to indicate their state.

Figure 12B:
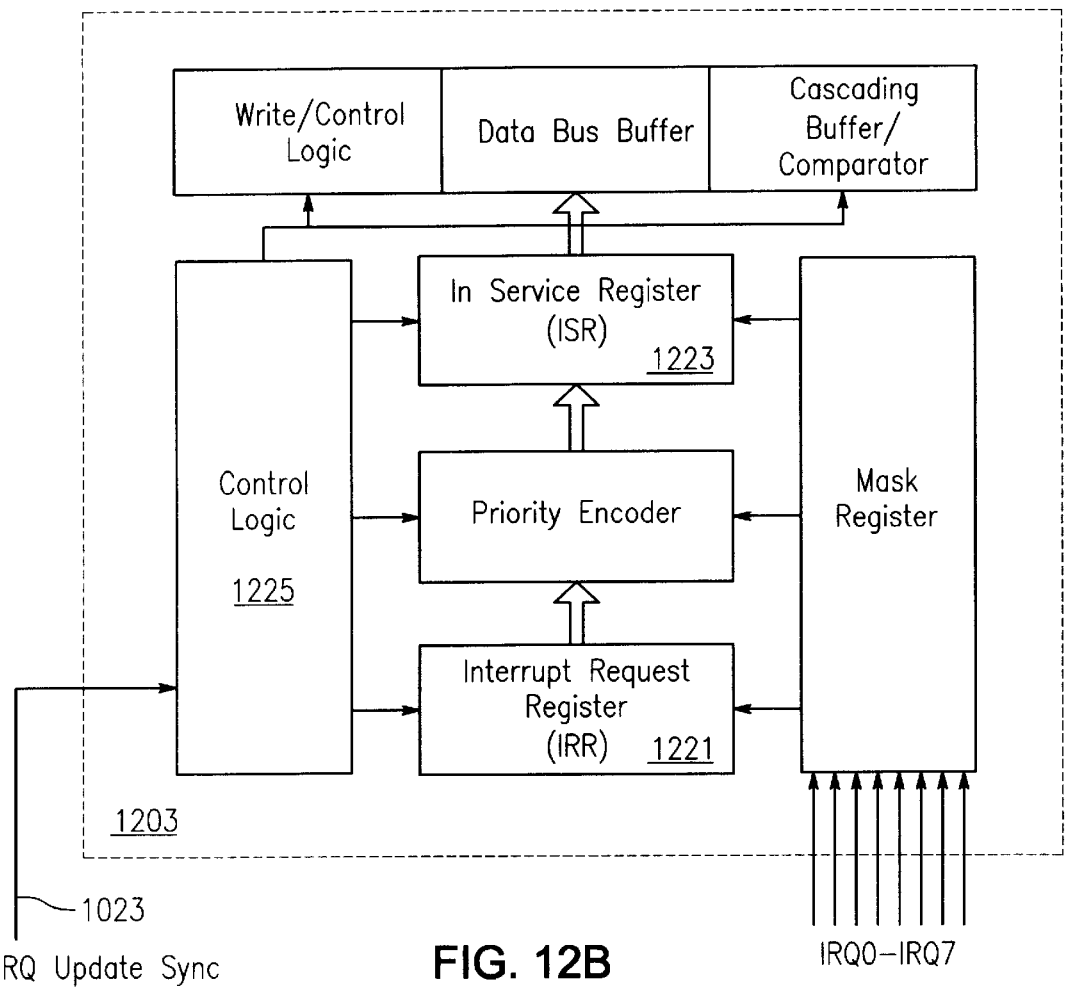
FIG. 12B shows a block diagram of an 8259A compatible logic circuit.

Referring to FIG. 12B, a simplified block diagram is shown of one of the dual 8259A compatible logic circuits shown in FIG. 12A. Interrupt Request Register (IRR) 1221 receives eight interrupt signals IRQ0–IRQ7. When one of the interrupts is asserted, a corresponding bit in IRR 1221 is set, and an interrupt signal (INTR) 1211 (FIG. 12A) is asserted to notify the microprocessor of the existence of the interrupt condition. Assuming interrupts are enabled in the processor, the CPU responds to the existence of the interrupt by providing two INTA/ pulses to INTA/ signal 1205 (FIG. 12A) via PCI bus 125 through PCI/ISA bridge 322 and thus to programmable interrupt controller 1203. The first INTA/ pulse causes the highest priority bit in the IRR to be transferred to the In-Service Register (ISR) 1223. The corresponding bit in IRR 1221 is cleared. The second INTA/ pulse causes the 8259A to output an 8 bit number corresponding to the interrupt onto data bits 1209. The details of the operation of the 8259A are known in the art and are described in, e.g., pages 557–573 of "The Indispensable PC Hardware Book" by Hans-Peter Messmer, and the data sheet entitled "8259A Programmable Interrupt Controller 8259A/ 8259A-2/8259A-8", pages 2-234–2-257, from Intel Corporation, dated October 1986, which are incorporated herein by reference.

When the interrupt has been serviced by the processor, an End of Interrupt (EOI) command is issued by the processor, by writing 20 h to address A0 h (slave programmable interrupt controller) or 20 h to address 20 h (master programmable interrupt controller). Receipt of the EOI command causes the active bit in Interrupt Service Register 1223 to be cleared and a determination is made of the next highest priority pending interrupt in Interrupt Request Register 1221, which is then serviced in the same manner.

However, the processor is typically operating significantly faster than the relatively slow PEB supplying the IRQs. In the illustrated embodiment, the maximum latency between updated IRQs (approximately 25 bit times) occurs during register read operations and is approximately 379 nanoseconds. The minimum latency is eight bit times (for five IRQs) when the IRQs are being provided as shown in Table 2. Because of the potential for a relatively long latency, the IRQ signals may not have been updated before the programmable interrupt controller 1203 receives the EOI command. Thus, the programmable interrupt controller may erroneously recognize the same interrupt twice.

An example of the latency problem associated with a relatively slow PEB supplying the IRQs is described now in more detail. The microprocessor, prior to issuing an EOI command, typically clears the source of the interrupt. That may be accomplished by, e.g., writing a bit out to the logic block (e.g., the floppy controller) causing the interrupt. Assume that the block is one that sent an IRQ through serial IRQ extractor 1013 (FIG. 10). The very next instruction executed by the processor may be an EOI. The EOI command may be received by programmable interrupt controller 1203 before the effect of clearing the interrupt has had time to ripple across the PEB, and be presented to the programmable interrupt controller. Thus, the highest interrupt pending seen by the Interrupt Service Register after receipt of the EOI command is the same interrupt that was just serviced because that interrupt is still asserted on the corresponding input to the programmable interrupt controller. Note that the interrupt is assumed to be kept at an active level by the interrupting device or circuit, until the interrupt has been serviced or cleared by the processor.

Figure 12C:
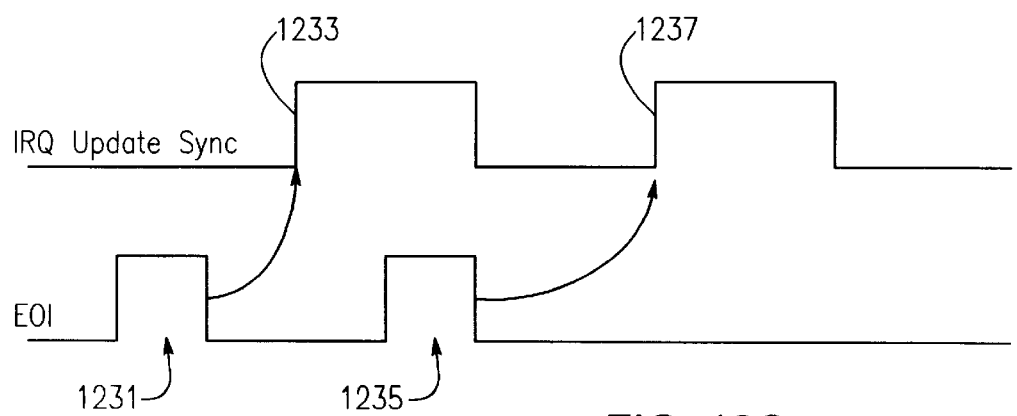
FIG. 12C shows a diagram illustrating the relationship between the IRQ update sync pulse and receipt of an EOI command.

In order to prevent an erroneous level triggered interrupt due to latency, according to the present invention, the interrupt controller 1203 does not reevaluate its IRQ inputs until the IRQ transmission following the End Of Interrupt command (EOI) from the CPU to the programmable interrupt controller. That can be accomplished in several ways. In one embodiment, the IRQ update synchronization signal 1023, indicating that updated IRQs are available, is provided to control logic 1225 in interrupt controller 1203. When an EOI command is received by programmable interrupt controller 1203, the control logic is modified such that programmable interrupt controller 1203 does not, upon receipt of the EOI command determine what is the next highest priority pending interrupt in Interrupt Request Register 1221, until receipt of the IRQ update sync signal. That is illustrated in FIG. 12C. If an EOI command is recognized at time 1231, the determination of the highest pending interrupt is delayed until the IRQ update sync signal is received at 1233, although it is permissible to update ISR 1223 (i.e. reset the active bit). If an EOI command is received at 1235, the determination of the highest pending interrupt is delayed until the next IRQ update sync pulse at 1237. The IRQ update sync signal provided to the interrupt controller may be delayed so that it coincides with the availability of the interrupts from IRQ mapper 1015, if necessary.

Many designs ensuring that the determination of the highest pending interrupt in IRR 1221 is not completed until receipt of the next IRQ update sync pulse are possible and would be readily apparent to one of ordinary skill. For example, once the programmable interrupt controller decodes the appropriate data and control signals to determine the existence of the EOI, the update of both ISR 1223 and IRR 1221 could be delayed until the next IRQ update sync signal.

In another embodiment, receipt of the EOI command coming across PCI/ISA bridge 322 is blocked in the South Bridge before it is provided to programmable interrupt controller 1203 rather than blocked internally to the programmable interrupt controller. The EOI command is then provided to the programmable interrupt controller after an updated IRQ is sent by serial IRQ extractor 1013 after the EOI command has been transmitted to the PCI/ISA bridge 322. That approach has the advantage of avoiding modifying the internal programmable interrupt controller logic but can stall the ISA bus since the ISA bus transaction did not complete.

Figure 12D:
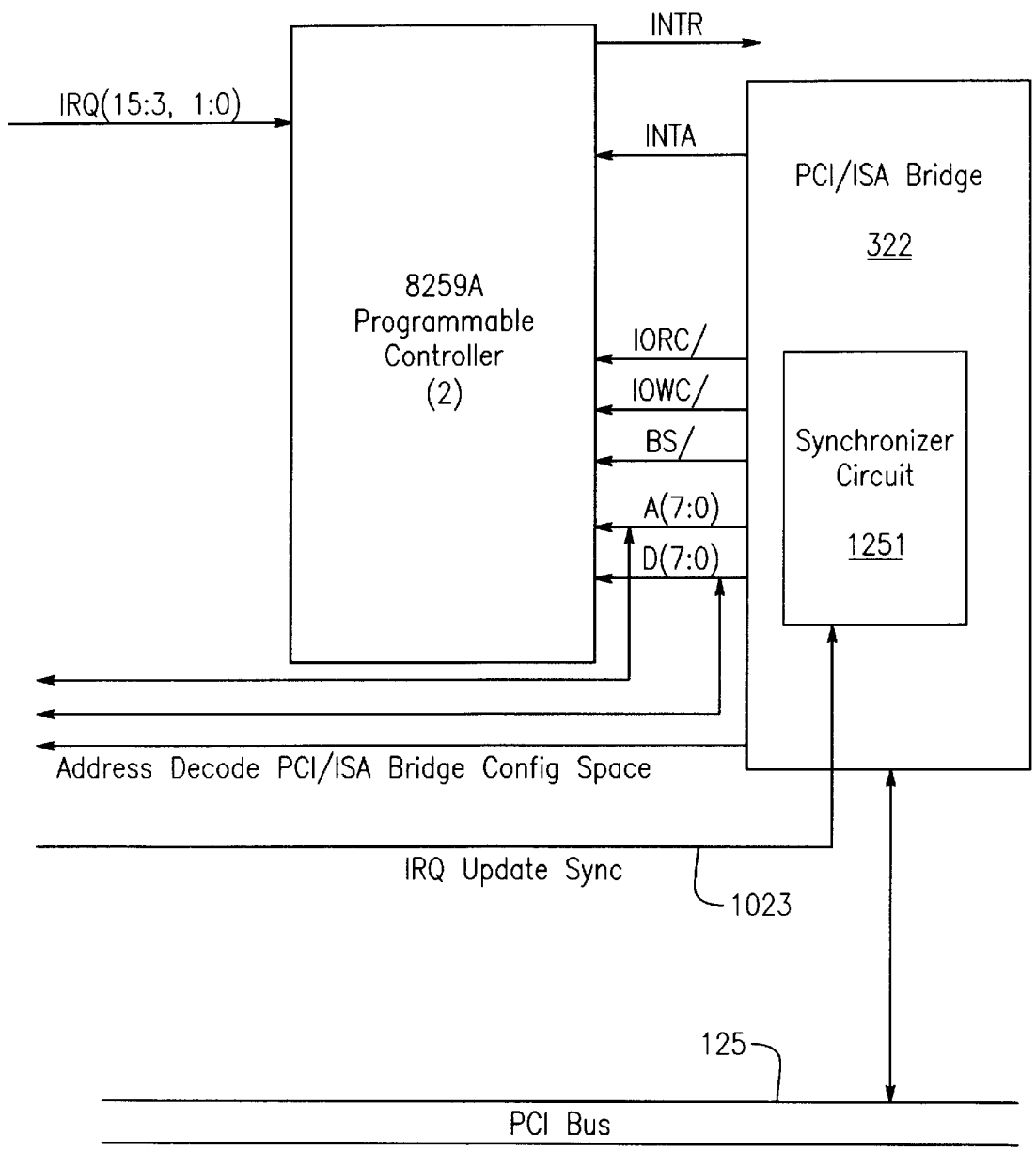
FIG. 12D shows a block diagram of an embodiment of the invention where the control logic is external to the interrupt circuit.

FIG. 12D illustrates an approach which avoids modifying the programmable interrupt controller internally. The circuit to provide the synchronization function between the EOI command and updated interrupt values may be provided in ISA Bridge circuit 322 which provides a bridge between PCI bus 125 and ISA bus 324. The ISA bridge circuit 322 receives IRQ update sync pulse 1023 as an indication of when updated IRQ values have been extracted from the serial bus and are available to the programmable interrupt controllers. The ISA bridge circuit 322 also decodes the address, data, IOWC/ (write) signal, and block select (BS/) signal to determine in synchronizer block 1251 when an EOI command has been issued by the processor to one of the 8259A programmable interrupt controller circuits. Synchronizer block 1251 waits to provide the programmable interrupt controllers with the EOI command until the next IRQ update signal has been received. Thus, the appropriate address, data and control signals may be latched and provided to the programmable interrupt control circuit, only after the next IRQ update has occurred.

Note that if IRQ update signal 1023 is provided to bridge circuit 322 it does not need to be provided to PIC control logic 1225. Also, the IRQ update sync pulses shown in FIG. 12C will occur at one frequency when the register access bus is idle or during write commands. However, the frequency of the update sync pulses will vary due to the different timing with which IRQs are provided during read commands as discussed with relation to FIG. 7.

Figure 13:
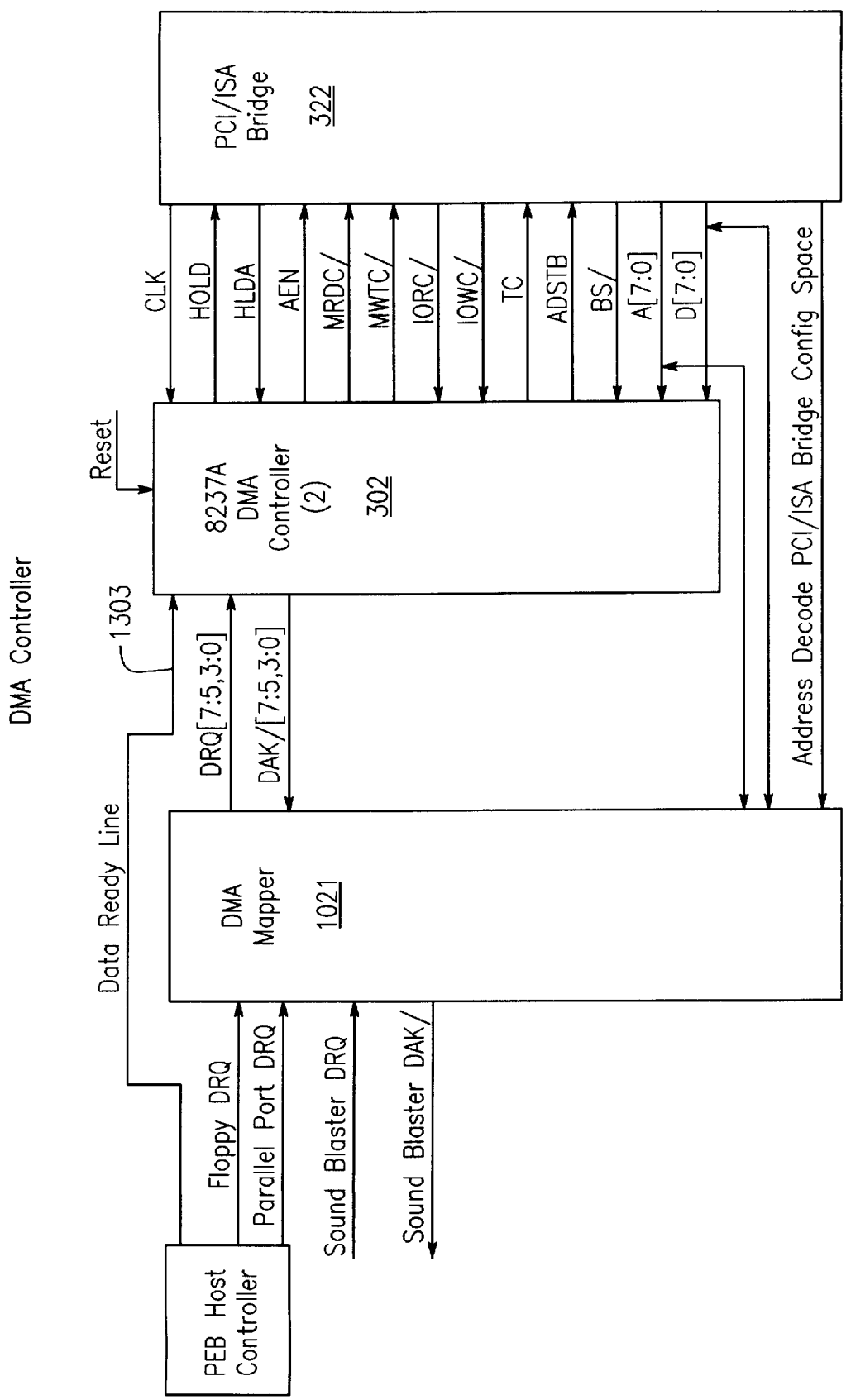
FIG. 13 is a block diagram of the DMA control logic in the South Bridge.

Referring again to FIG. 10, the serial DRQ extractor and P&P mapping table 904 is shown in more detail. Serial DRQ extractor 1019 receives data from the DRQ in pin, and extracts the floppy and parallel port DRQs from the bit stream based on the time slot assignments. The state of the two DRQ signals is being updated in the described embodiment at a rate of seven times per frame. Referring to FIG. 13, the extracted DRQ signals are sent to the DRQ Plug & Play mapper 1021 where they are programmably routed to the desired DRQ input on the DMA controllers. For legacy reasons, the floppy DRQ is preferably assigned to DRQ2. Thus, for this particular embodiment, only the parallel port DRQ is programmably mapped. The DMA mapper 1021 also receives a SOUND BLASTER DRQ and provides a SOUND BLASTER DAK/(DMA acknowledge) signal. The mapped DMAs are provided to DMA controller 302 which in the embodiment shown is two 8237A DMA controllers. The DMA controller interfaces with the PCI/ISA bridge 322.

Note that the mapper function 1021 may be located with the DMA controller 302 as part of an overall DMA P & P mapper.

Because of the latency between the start of a DMA generated register access to one of the ISA resident memory locations in the PEC and the update of the DRQ signals (up to approximately 530 ns for a 16 bit transfer(assuming 35 clocks for the transfer)), the DMA controller should not reevaluate its DRQ inputs until after the DRQ transmission after a DMA cycle. That can be implemented by holding the data ready line 1303 inactive.

Figure 14:
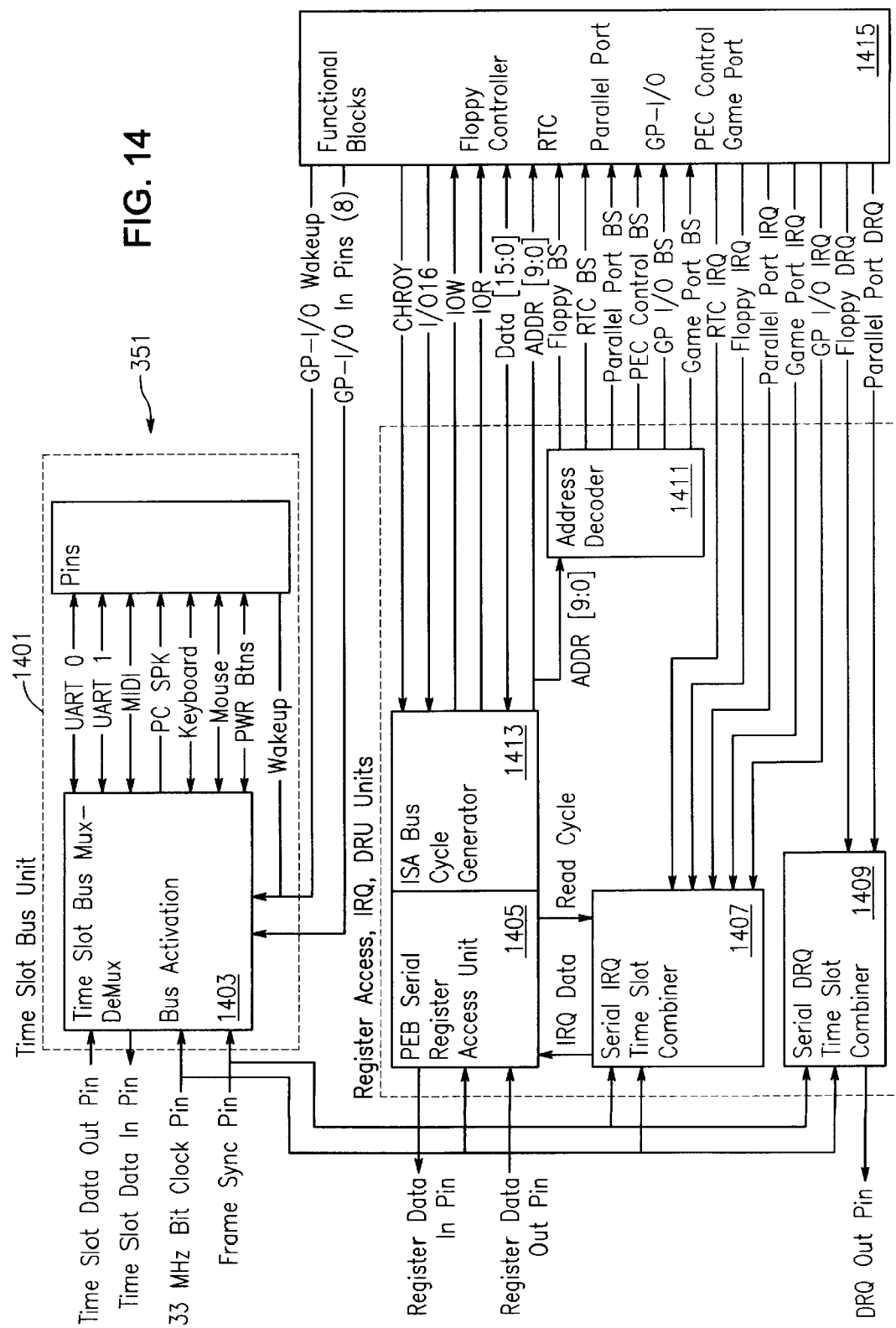
FIG. 14 is a block diagram of the port expansion integrated circuit.

Referring to FIG. 14, a more detailed block diagram of the PEC is shown. Time slot bus unit 1401 interfaces to the time slot bus, receiving data from the time slot data out pin, the bit clock, the frame sync, and provides time slot data in. Block 1403 provides a multiplexing-demultiplexing function to demultiplex data bits received from the PIT 304, keyboard/mouse controller 314, MIDI controller 310, and the serial port(s) 316 and provide the received signals to their respective pins. Block 1401 also receives serial port data (UART0 and UART 1), MIDI data, keyboard and mouse data and multiplexes those signals along with power buttons, and wakeup and general purpose I/O pins onto the time slot data in signal line. The time slot bus unit also provides the bus activation logic resulting in the assertion of the time slot data in signal as shown in FIG. 11, on receipt of a signal that causes a wakeup condition.

The PEC also includes PEB serial register access unit 1405 which receives the bit clock and the register data in signal and provides the register data out signal. The register access unit 1405, responds to the start bit as shown in FIG. 7. The register access unit determines whether the access is a read or write according to the read/write bit 703 and the size of the access according to the data size bit 705 indicating an 8 or 16 bit access. That information, along with the address (and data if the operation is a write operation) is provided to ISA bus cycle generator 1413 which generates an internal PEC ISA bus cycle to recreate a representation of the ISA bus in the PEC. Note that it may be not the same ISA representation as in the South Bridge. For example, the PEC ISA representation in the embodiment shown has fewer address lines. The 10 bits of address information is also provided to address decoder 1411 which decodes the 1 k address space into block selects for the various functional blocks 1415. The functional blocks may include the floppy controller, RTC, parallel port, PEC control register(s), GP I/O and the game port.

The ISA bus cycle generator 1013 provides the IOW (write) and IOR (read) signals along with the data bits and 10 bits of address. The ISA bus cycle receives the I/O16 signal line from the ISA resident logic blocks which indicates the size of the data being provided. The ISA cycle is built in accordance with FIG. 7. IOW/ is asserted at 710 with the leading edge of the bit clock synchronous with bit 0 of the data. IOW/ is deasserted at 712 at the falling edge of the bit clock starting the tenth bit for an 8 bit transfer and at 714 at the falling edge of the clock one bit time after the last data bit is transferred for a sixteen bit transfer as shown in FIG. 7.

For read operations, the functional blocks provide 8 or 16 bit data over the data lines to the ISA bus cycle generator 1413 to be transferred on the register data in line to the South Bridge. Read timing is shown in FIG. 7. IOR/ is asserted at 716 and deasserted at 718 following the receipt of the 10 bits of address data. Read data 713 and 715 is provided from one of the selected function blocks 1415 as shown in FIG. 7. Although the number of address bits shown in the embodiment is 10 bits, more or less bits may be provided depending upon the address range desired in the PEC. If the data cannot be provided during a read operation, then the start bit 731 is delayed until data is available.

The floppy controller, RTC, parallel port and game port are well known logic functions that will not be described further herein. The PEC control registers are mapped to the ISA to allow for read/write access to PEC control registers.

The PEC also includes serial IRQ time slot combiner 1407 which receives a read cycle indication from the PEB serial resister access unit 1405, the frame sync and the bit clock. The serial IRQ time slot combiner 1407 receives the RTC, floppy controller, parallel port, game port and GP I/O interrupt requests, and provides those interrupt requests to the PEB serial register access unit 1405 for multiplexing onto the register data in pin as described in relation to FIG. 7.

The PEC also includes serial DRQ time slot combiner 1409 which receives a the frame sync, bit clock and DMA requests from the floppy controller and parallel port. The serial DRQ time slot combiner 1409 provides those DMA interrupt requests to the South Bridge over the DRQ Out pin as described previously herein.

The port expansion circuit is pad-limited (meaning that the minimum size of the integrated circuit, as determined by the number of pins located around the outside edge of a square, is larger than the area necessary to contain the chip's logic). Thus, adding additional the function to the PEC produces little marginal cost increase and integration reduces motherboard chip count, board space, and cost.

Providing I/O capability for all the legacy devices as well as performing the bus interface and other functions on the South Bridge would require an integrated circuit with more I/O capability and would therefore could be a more expensive part. It is preferable to build an integrated circuit which can be more inexpensively packaged in, e.g., quad flat packs and avoid more expensive packaging such as ball grid arrays which can provide higher pin density but can also be more costly to produce. In many instances, reducing pin count significantly can reduce the package cost of the product.

Placing the legacy I/O terminals as well as some of the of the functional logic blocks (e.g., the game port, parallel port and floppy disk controller) in the PEC as described herein provides further advantages. As discussed, as process geometries shrink for faster and denser integrated circuits, e.g. channel lengths of 0.35 microns and below, supply voltages drop, e.g., to 3.3. volts or less, leading to problems driving the various devices on the I/O interface pins which are typically 5 volts. The legacy I/O interfaces tend to be 5 volts interfaces which is typical of the legacy devices. Since high speed is desired for the South Bridge integrated circuit, it is preferable to build the South Bridge chip with the smaller process geometries to provide a faster and denser chip.

However, the port expansion circuit chip can be built with slow technologies, e.g., where the transistors have channel lengths of e.g., 0.5 microns or above. That allows the port expansion circuit to be built with older and less expensive process technology and also allows the port expansion circuit to easily interconnect to the 5 volts interfaces typical of the legacy devices. Additionally, slower logic functions such as the parallel port, floppy controller, and game port can be placed on the PEC, which is pad limited, meaning the size of the chip is determined by the number of I/O pins, not the amount of logic placed on the chip. Additionally, analog functions, such as those required for the game port can be more readily incorporated into older and more stable process technologies. At the same time, the more speed sensitive South Bridge can be built with the most up to date process technologies providing channel lengths for the transistors of the internal logic of, e.g., 0.35 microns, without the problem of interconnecting to a large number of 5 volts interfaces.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A computer system comprising:
   an interrupt circuit disposed on a first integrated circuit and coupled to receive at least one interrupt request;
   an interrupt synchronization control circuit disposed on said first integrated circuit and coupled to receive an update synchronization indication, indicating when a value of said one interrupt request has been updated, said interrupt synchronization control circuit also coupled to receive an end of interrupt indication, said interrupt synchronization control circuit preventing said interrupt circuit from determining if said interrupt request is asserted once said end of interrupt indication has been received by said synchronization control circuit, until after a next update synchronization signal is received.

2. The computer system as recited in claim 1 further comprising:
   an interrupt request extraction circuit disposed on said first integrated circuit, said extraction circuit extracting an updated value of said one interrupt request from a plurality of information bits received on a bus and providing said update synchronization signal, thereby indicating said updated value of said interrupt request is available.

3. The computer system as recited in claim 2 wherein said bus is a serial bus and said one interrupt request is extracted according to a fixed time slot relative to a periodic frame synchronization signal.

4. The computer system as recited in claim 3 wherein said one interrupt request is extracted according to a fixed time slot relative to a start bit during a read operation.

5. The computer system as recited in claim 1 wherein said interrupt synchronization control circuit is embedded in said interrupt circuit and said interrupt synchronization control circuit prevents said interrupt circuit from determining if said at least one interrupt request is asserted once said end of interrupt indication has been received by said interrupt circuit until after said next update synchronization signal is received by said interrupt circuit.

6. The computer system as recited in claim 1 wherein said interrupt synchronization control circuit is external to said interrupt circuit, and wherein said interrupt synchronization control circuit prevents said interrupt circuit from receiving said end of interrupt indication until after said next update synchronization signal.

7. The computer system as recited in claim 6 wherein said end of interrupt indication provided to said interrupt circuit includes a select signal to select said interrupt circuit, and a plurality of data bits.

8. The computer system as recited in claim 1 wherein said computer system includes a processor providing said end of interrupt indication, said end of interrupt indication indicating that an interrupt request has been serviced by said processor.

9. A method comprising:
   providing a plurality of interrupt requests to an interrupt circuit located on a first integrated circuit;
   receiving an update synchronization indication periodically, at an interrupt synchronization control circuit, each said update synchronization indication indicating that updated values of said interrupt requests are available;
   receiving an end of interrupt indication at said interrupt control circuit prior to a next update synchronization indication; and
   preventing said interrupt circuit from evaluating said interrupt requests after said end of interrupt indication has been received until after said next update synchronization signal is received.

10. The method as recited in claim 9 further comprising:
    extracting said updated values of said interrupt requests from a plurality of information bits received on a bus coupling said first integrated circuit to a second integrated circuit; and
    generating each update synchronization indication when said updated values of said interrupt requests have been extracted.

11. The method as recited in claim 10 wherein said bus is a serial bus, said method further comprising extracting said interrupt requests according to fixed time slots relative to a periodic frame synchronization signal.

12. The method as recited in claim 10 further comprising extracting said interrupt requests according to fixed time slots relative to a start bit during a read operation.

13. The method as recited in claim 10 wherein said update synchronization indication periodically received is received at varying rates according to activity on said bus.

14. The method as recited in claim 9 wherein said interrupt synchronization control circuit is embedded in said interrupt circuit.

15. The method as recited in claim 9 wherein said interrupt synchronization control circuit is external to said interrupt circuit, and wherein the step of preventing comprises preventing said interrupt circuit from receiving said end of interrupt indication until after said next update synchronization indication is received by said synchronization control circuit.

16. The method as recited in claim 15 wherein said end of interrupt indication provided to said interrupt circuit includes a select signal to select said interrupt circuit, and a plurality of data bits having a predetermined value, thereby providing said end of interrupt indication.

17. The method as recited in claim 9 further comprising:
    providing said end of interrupt indication from a processor coupled to said first integrated circuit, thereby indicating that said processor has serviced an interrupt condition.

18. A computer system comprising:

an interrupt control circuit on a first integrated circuit receiving a plurality of interrupt requests;

means for sending at least one of said interrupt requests to said first integrated circuit from a second integrated circuit over a bus;

means for providing an update synchronization indication indicating that an updated value of said one of said interrupt request is available; and synchronization control means disposed on said first integrated circuit and coupled to receive said update synchronization signal and coupled to receive an end of interrupt indication provided by a processor, said control means for preventing said interrupt circuit from evaluating its interrupt requests once said end of interrupt indication has been received by said control means, until after a next said update synchronization indication is received.

19. The computer system as recited in claim 18 further comprising:

means for extracting said updated value from a serial data provided over said bus.

* * * * *